UNITED STATES PATENT OFFICE.

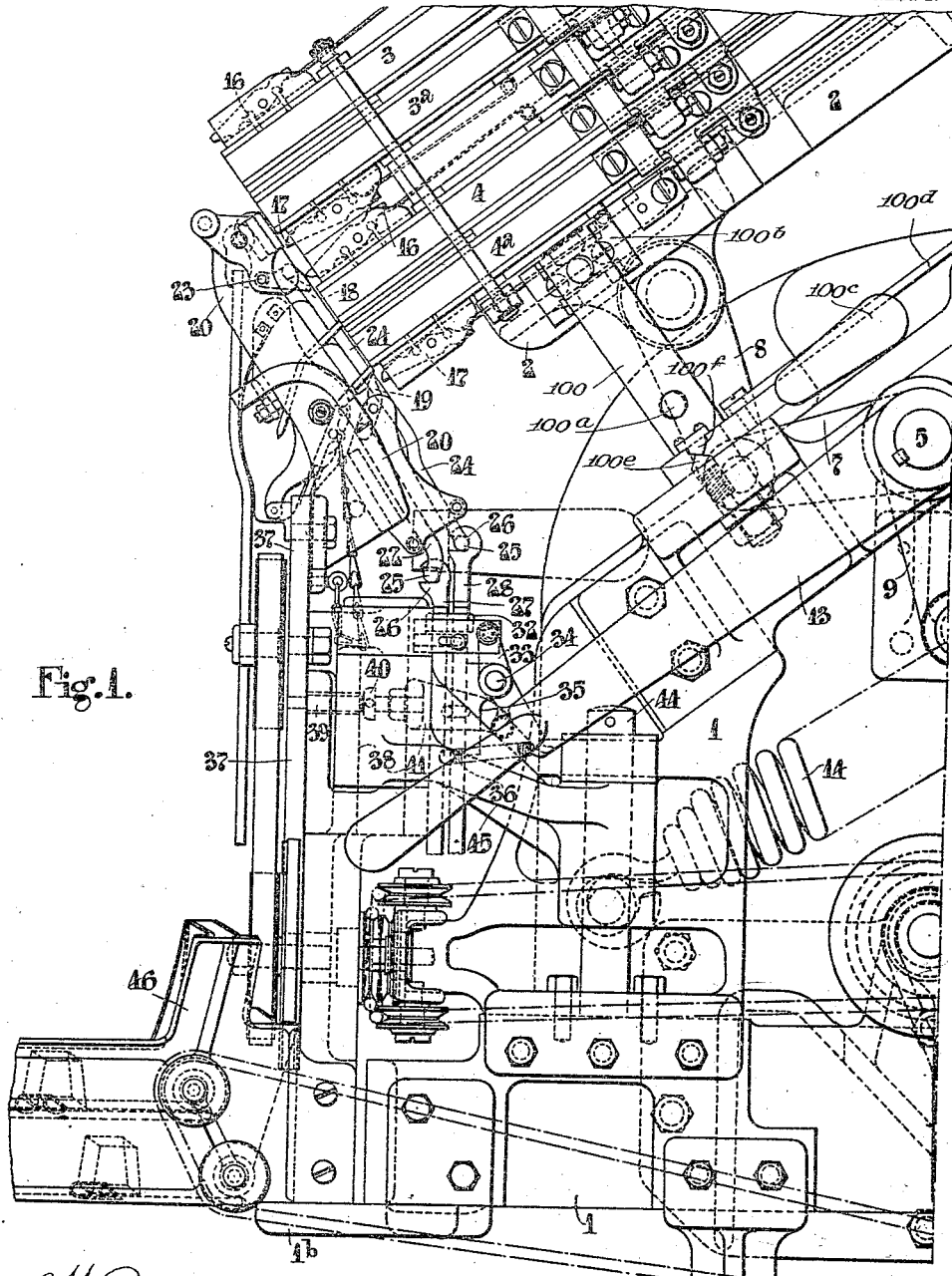

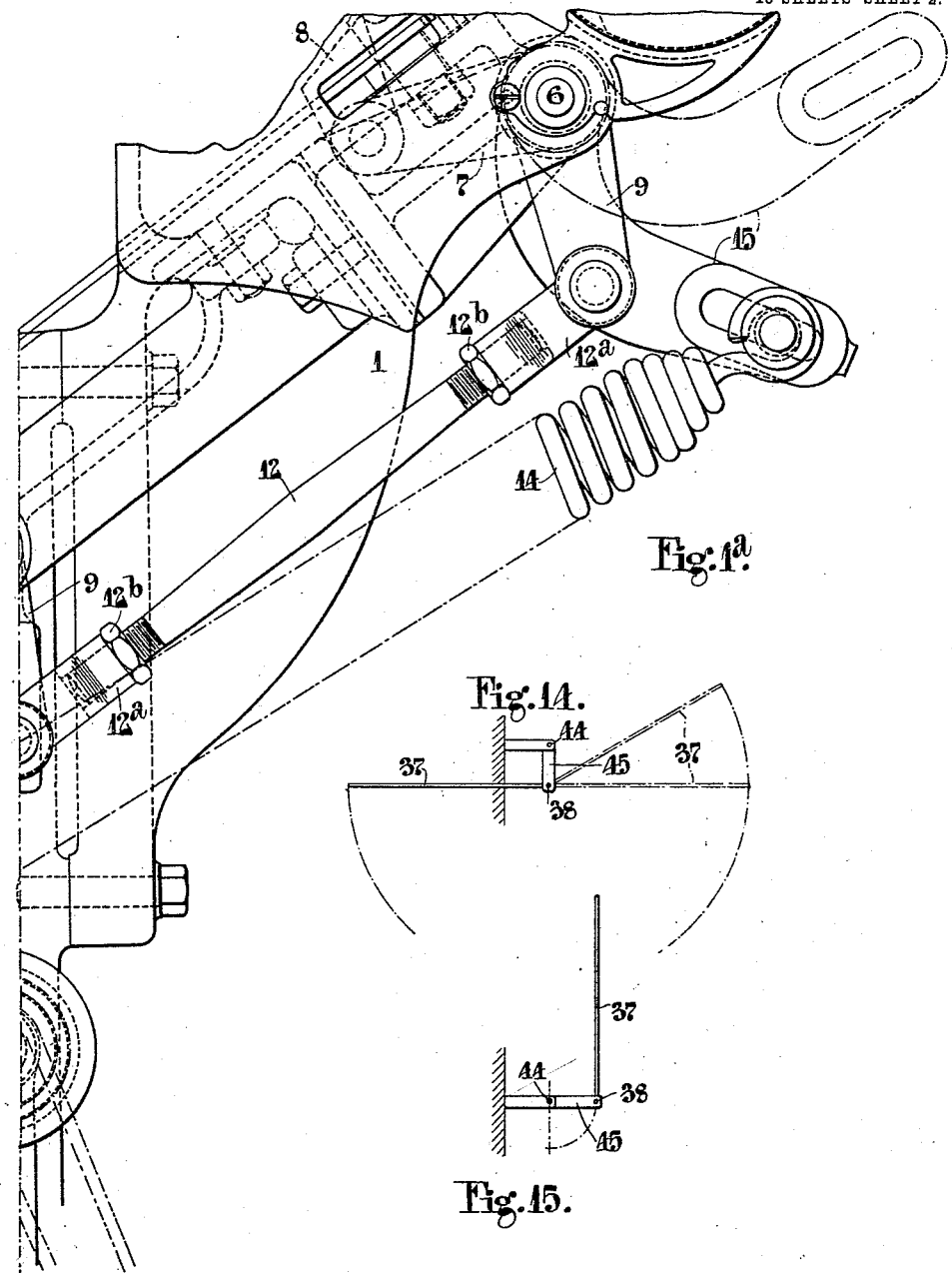

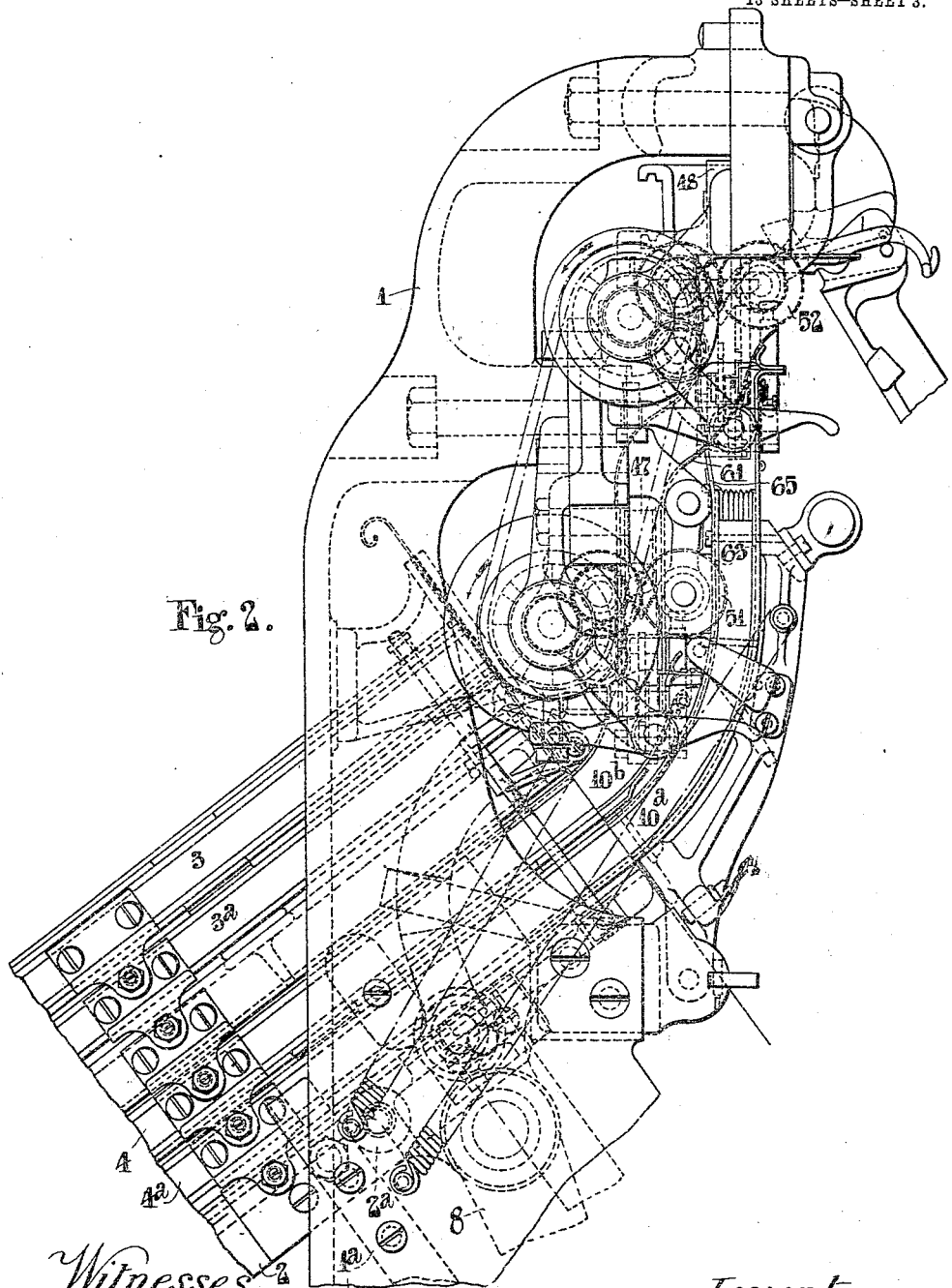

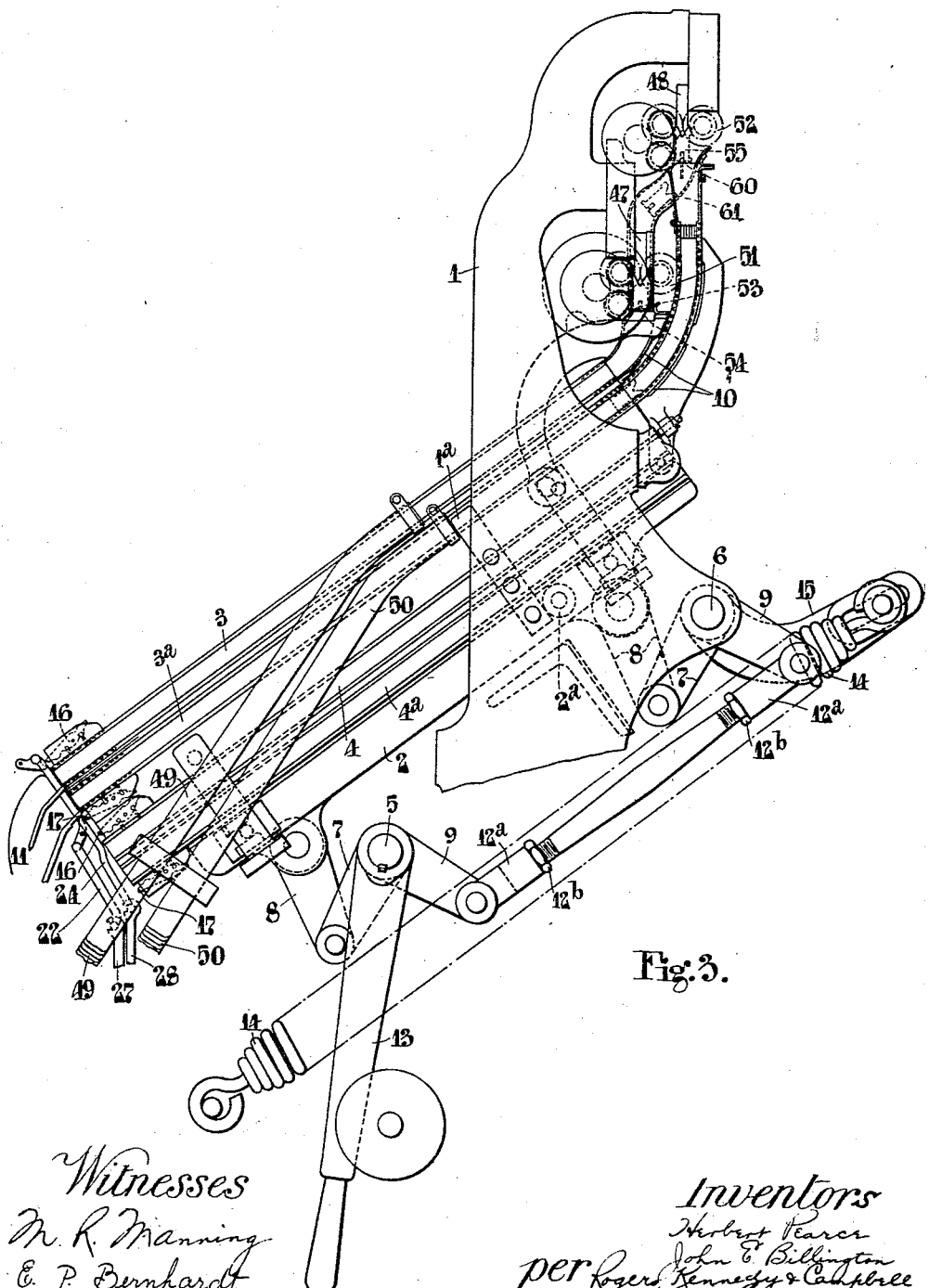

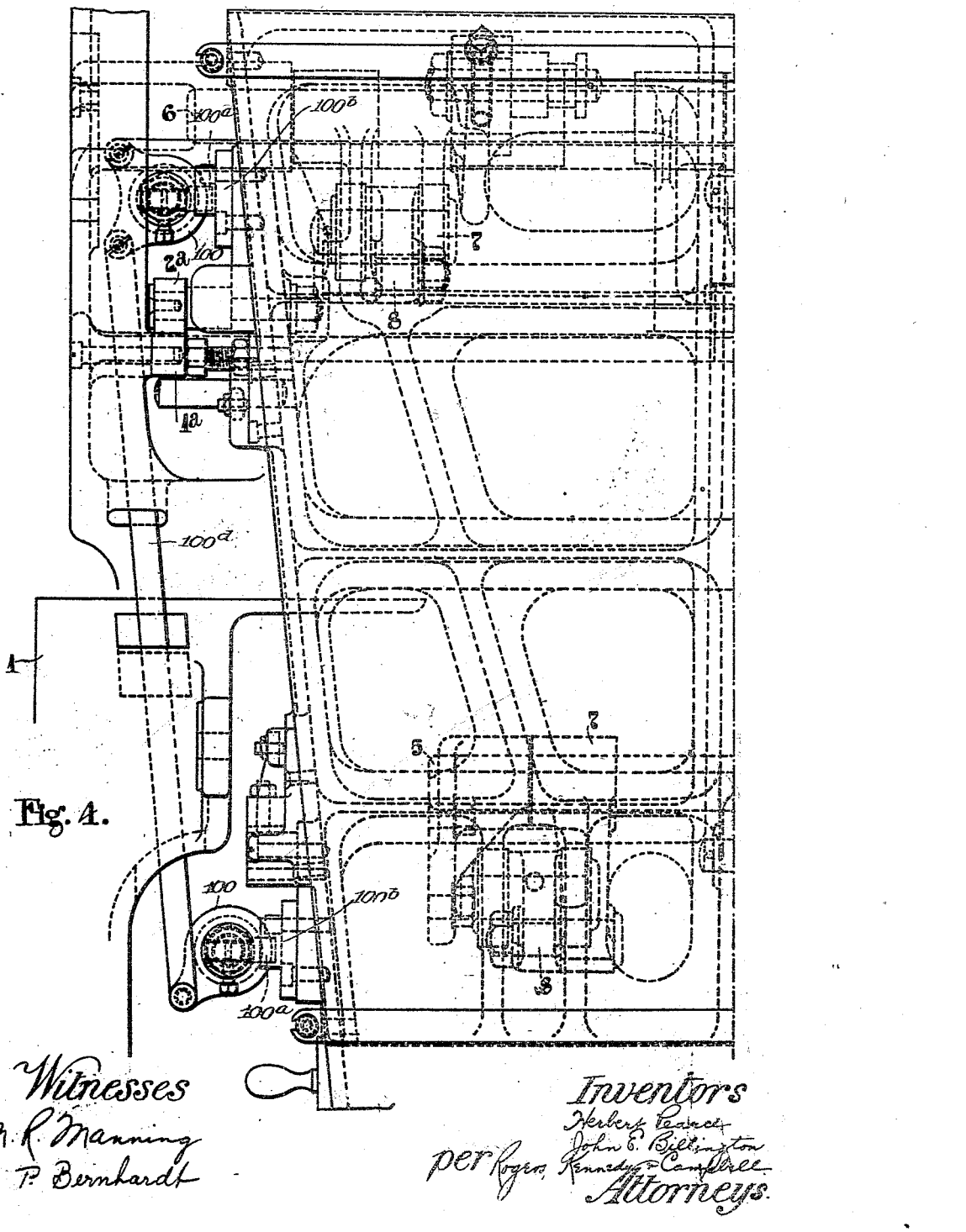

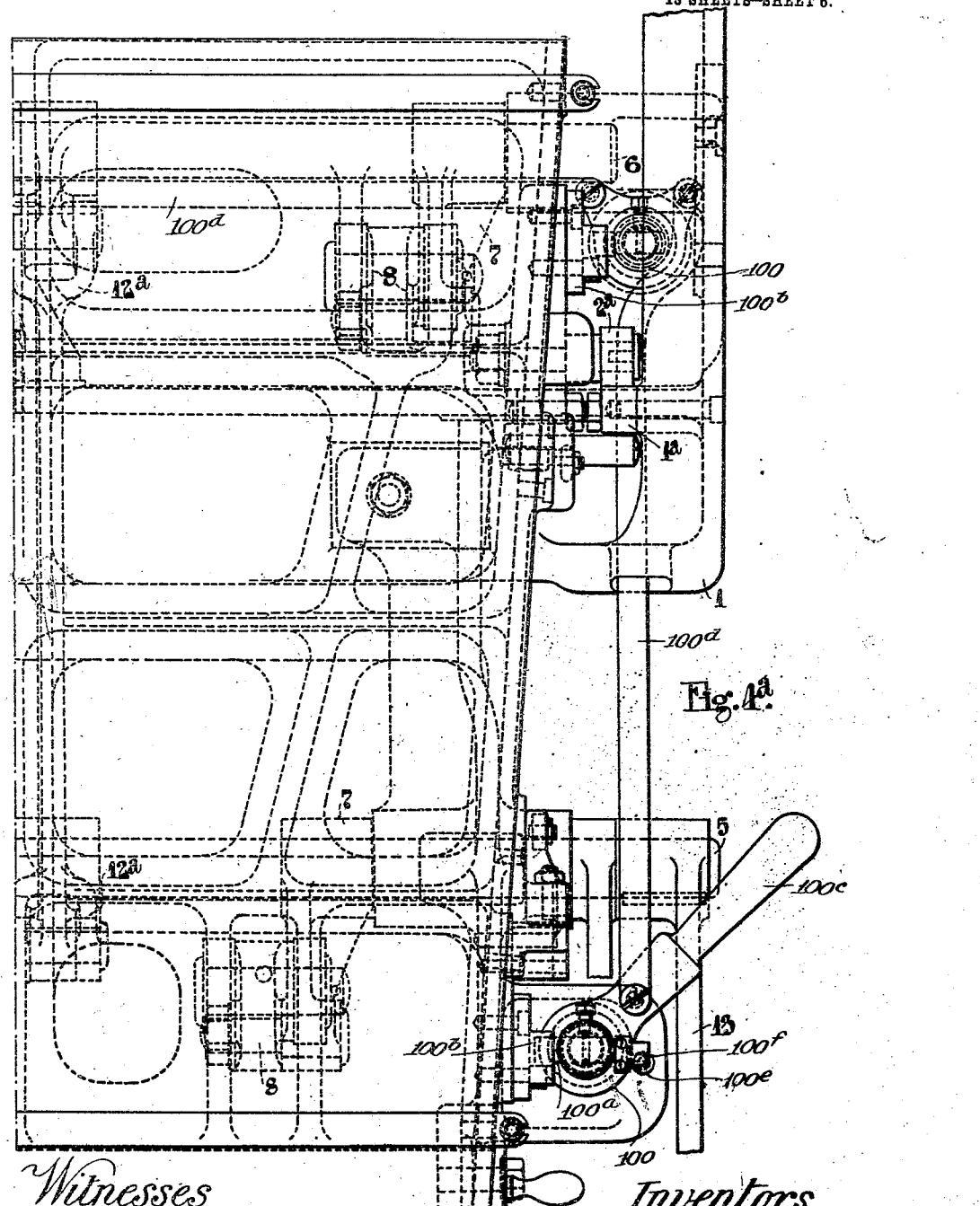

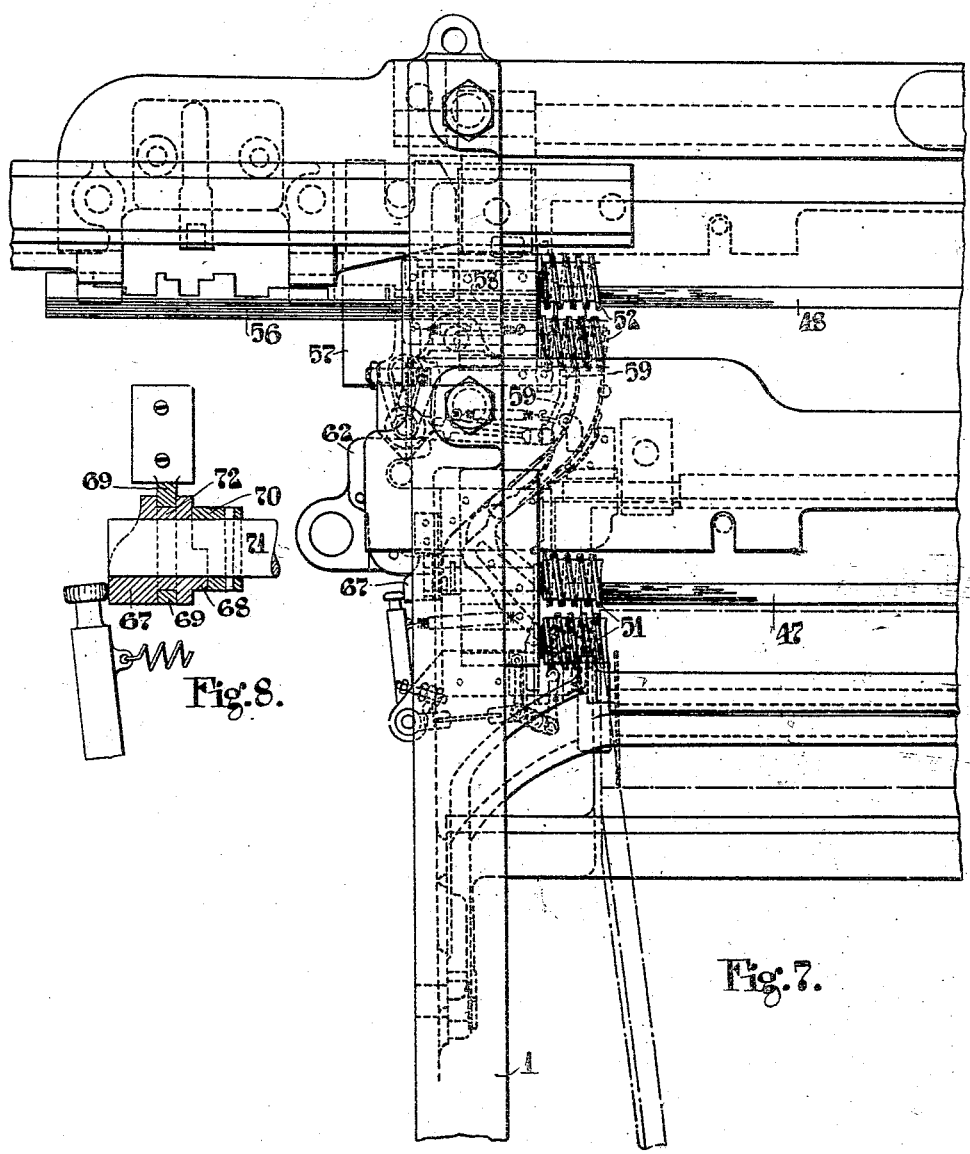

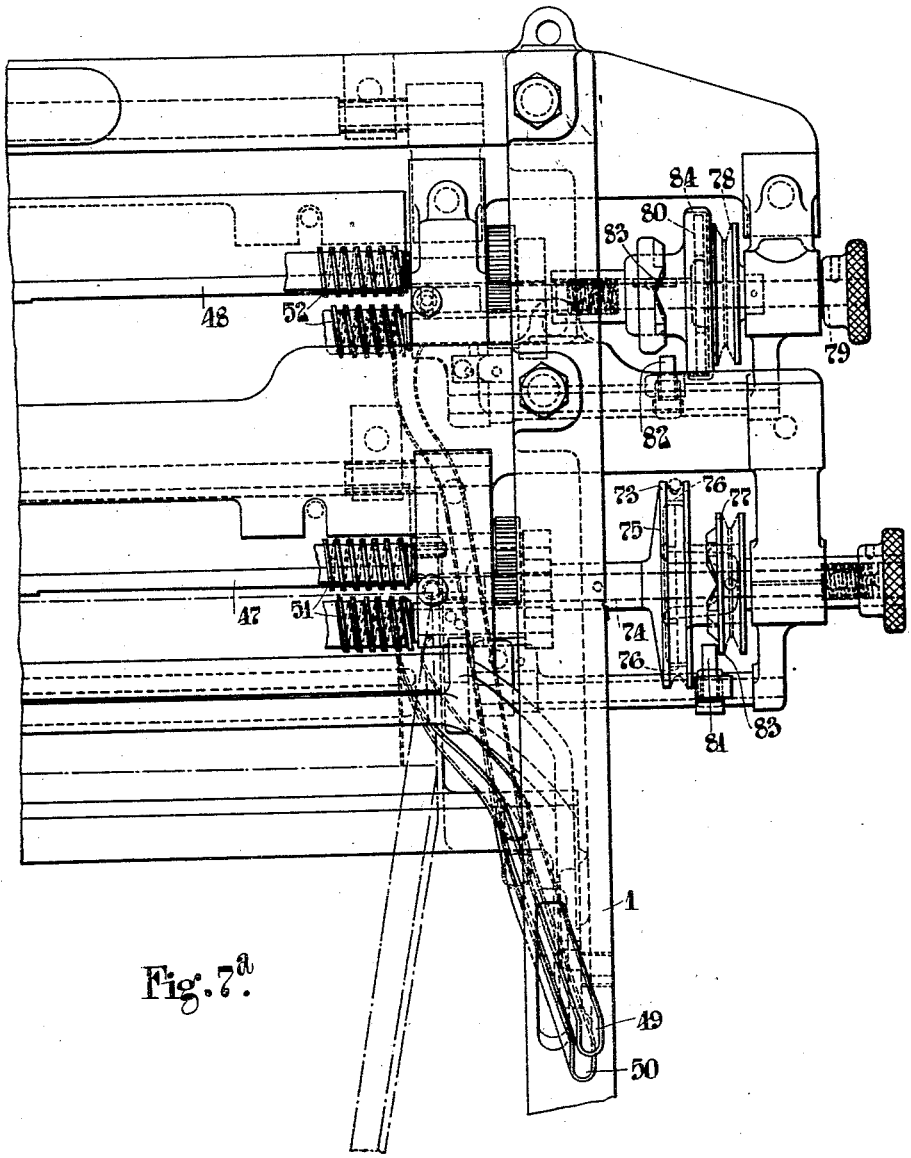

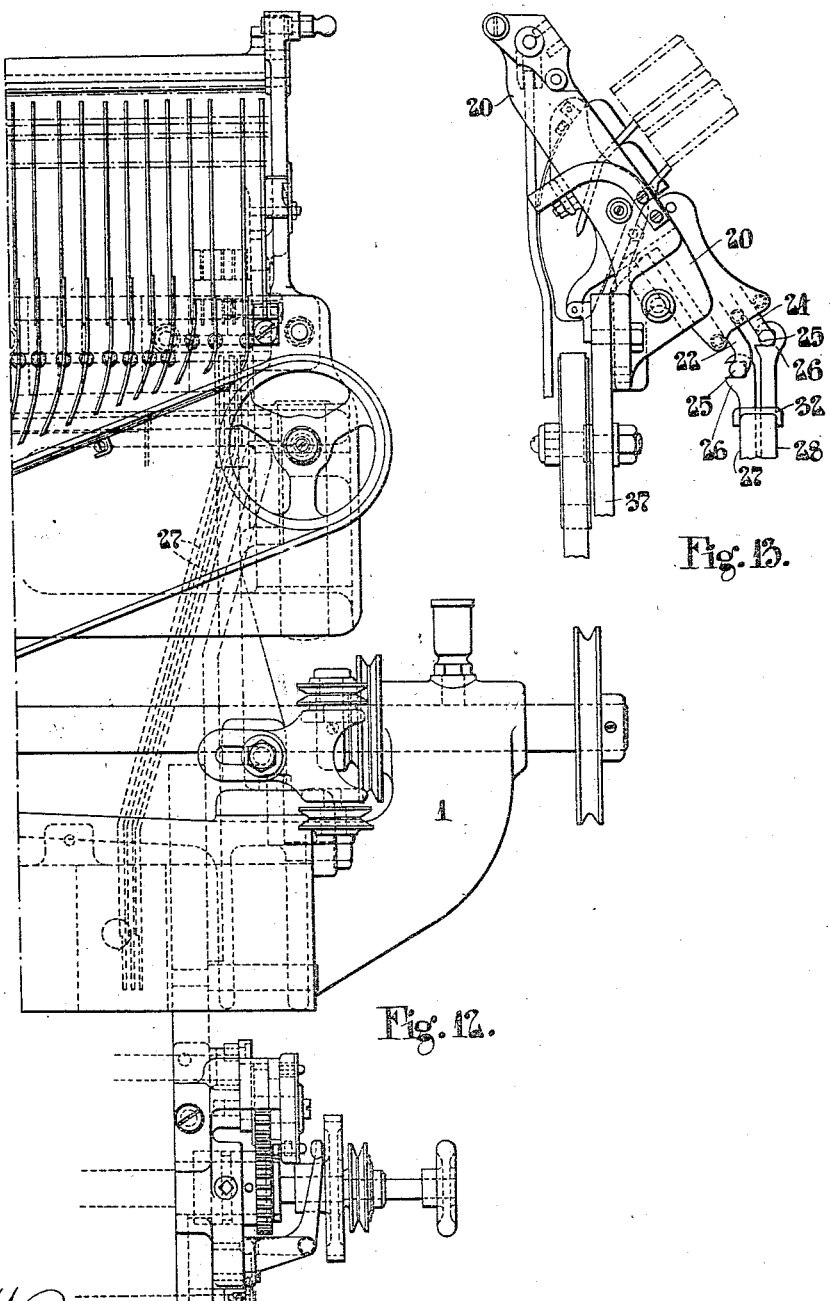

HERBERT PEARCE AND JOHN ERNEST BILLINGTON, OF BROADHEATH, ENGLAND, ASSIGNORS TO LINOTYPE AND MACHINERY LIMITED, OF LONDON, ENGLAND.

TYPOGRAPHICAL COMPOSING-MACHINE.

1,136,553.

Specification of Letters Patent. Patented Apr. 20, 1915.

Application filed January 27, 1914. Serial No. 814,670.

*To all whom it may concern:*

Be it known that we, HERBERT PEARCE and JOHN ERNEST BILLINGTON, subjects of the King of the United Kingdom of Great Britain and Ireland, and residing at Linotype and Machinery Works, Broadheath, in the county of Chester, England, have invented new and useful Improvements in Typographical Composing-Machines, of which the following is a specification.

This invention relates to improvements in typographical composing machines particularly machines such as those known commercially under the trade mark "Linotype", and kindred machines.

Among the several objects of the present invention is that of providing a plurality of superposed pairs of magazines—that is, pairs in the sense that different pairs of them can, alternatively be brought into operative position—and two relatively fixed distributer mechanisms and assembler plate entrances, with which the said pairs can be brought into operative relationship, and key mechanism which can be readily placed in and out of operative connection with the escapement devices of one or other of the pair of magazines which, for the time-being, is in operative position.

The invention will now be described by reference to the accompanying drawings which are drawn to various scales and are to be taken as part of this specification and read therewith.

Figures 5, 6:
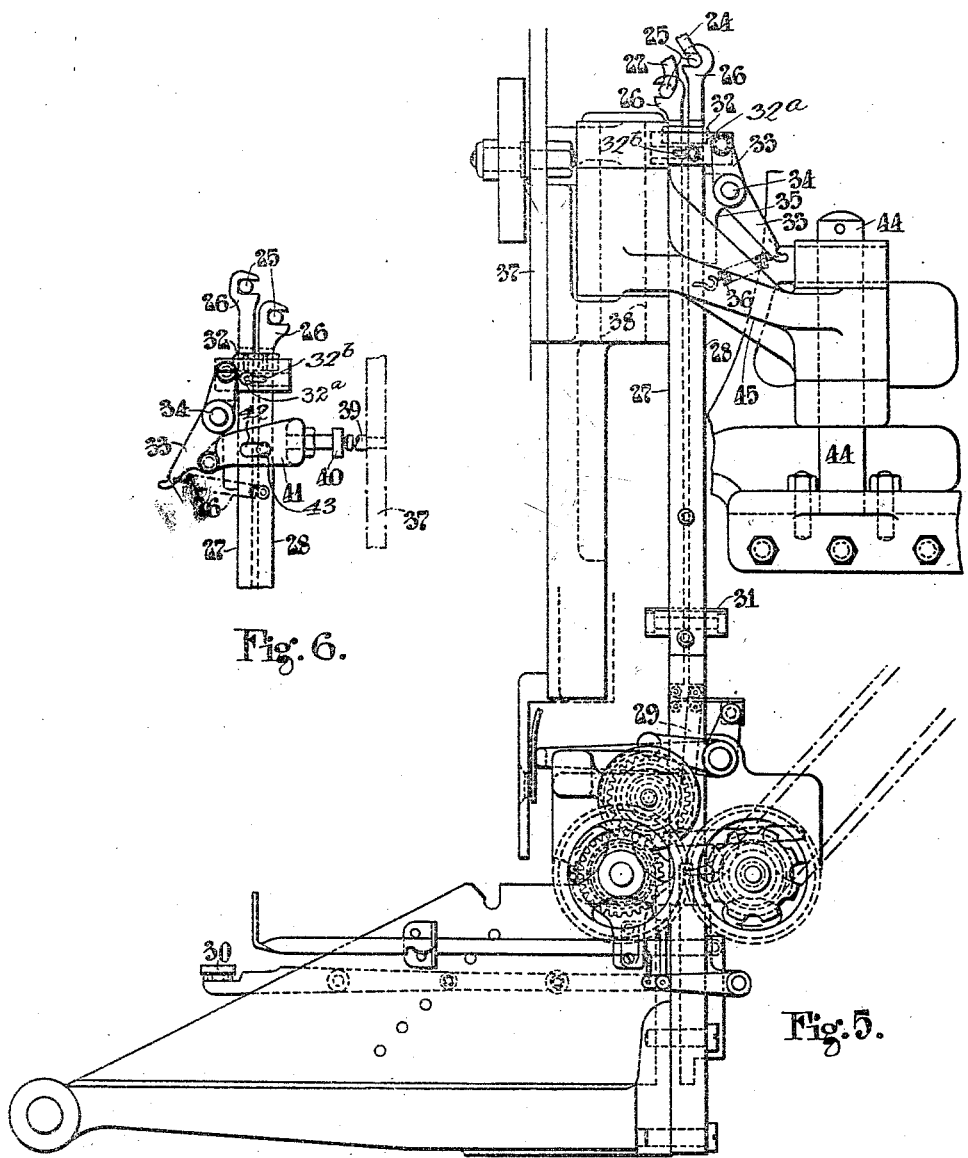
Figure 9:
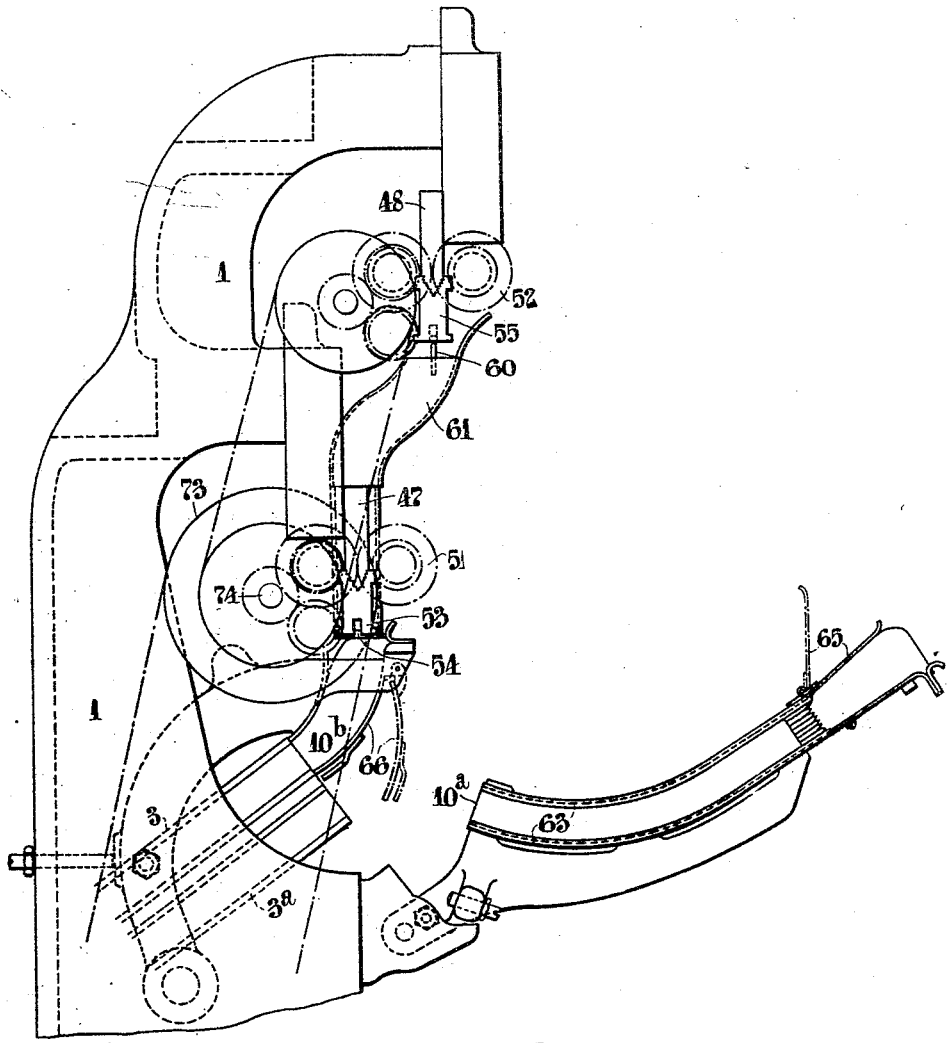
Figure 10:
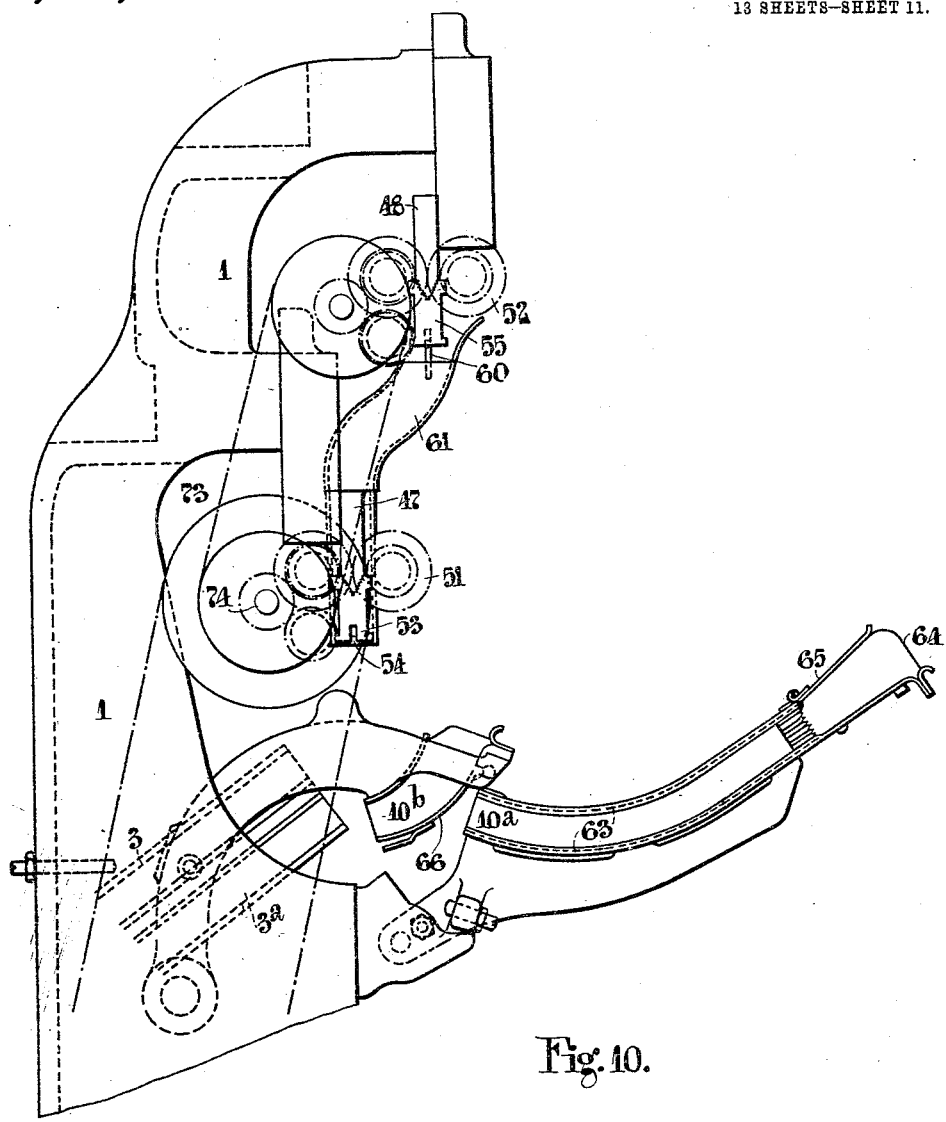
Figure 11:
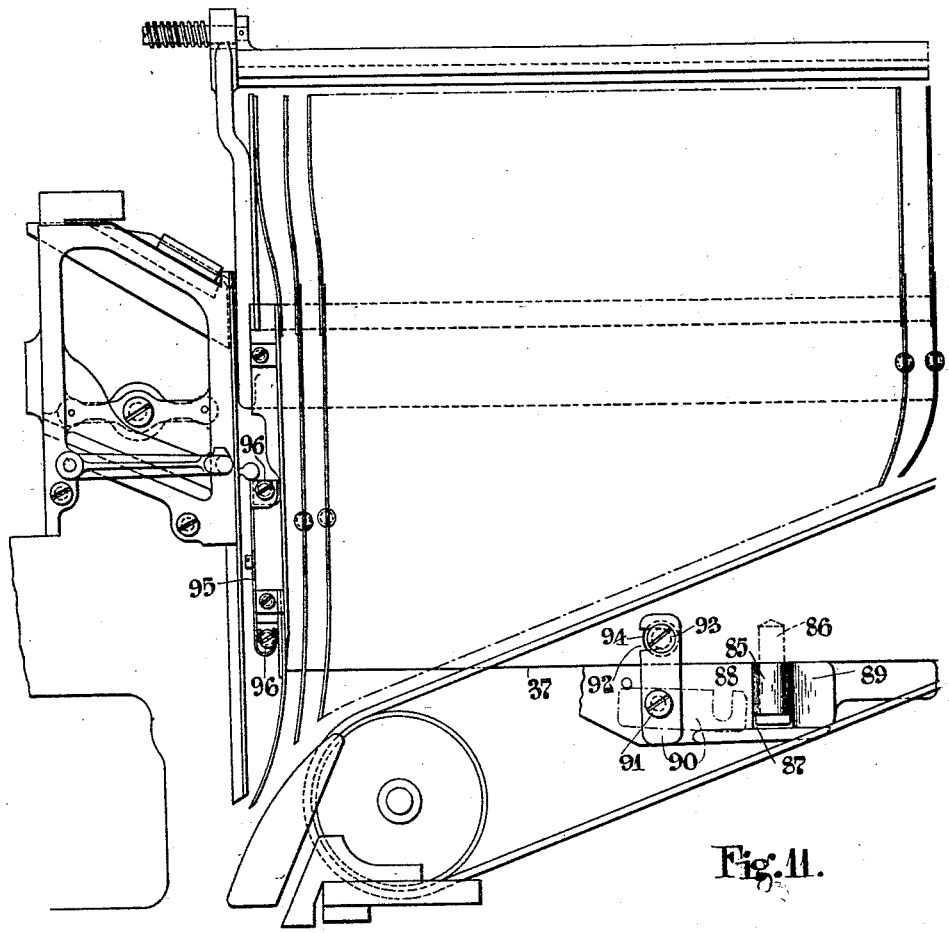

In these drawings:—Figure 1 is the left-hand lower part, and Fig. 1ᵃ the right-hand lower part, of a side elevation of a machine embodying the present invention, the dot-and-dash lines at the extreme right of Fig. 1 and extreme left of Fig. 1ᵃ both representing the line at which the two figures would unite to form a single figure; Fig. 2 is the upper part of the same side elevation as that represented by Figs. 1 and 1ᵃ, but with parts intervening between those illustrated in Fig. 1 and Fig. 2 omitted; Fig. 3, is a side elevation somewhat similar to Figs. 1 and 2 but drawn to a smaller scale than are those figures, and showing the column of magazines in a different position to that in which they are shown in the said figures; Fig. 4 is the left-hand part and Fig. 4ᵃ the right-hand part of a plan of the magazines and parts adjacent thereto; Fig. 5 is a right-hand side elevation of the key-board and parts adjacent thereto; Fig. 6 is an elevation as seen from the left-hand side of the machine, of parts of the mechanism shown in Fig. 5; Fig. 7 is the left-hand part and Fig. 7ᵃ the right-hand part of a front elevation partly broken away, of the distributer mechanism; Fig. 8 is a sectional view, as seen from the front of the machine, of a part of the distributer mechanism; Figs. 9 and 10 are two right-hand side elevations showing the same parts of the distributer mechanism in respectively different positions; Figs. 11 and 12 are two different parts of the same front elevation of the assembler plate and parts adjacent thereto; Fig. 13 is a right-hand side elevation of the upper part of Fig. 12, and Figs. 14 and 15 are diagrams showing in plan the manner in which the assembler plate is capable of being swung into and out of operative position.

1 is the main frame of the machine, or as much of it as is necessary to be illustrated in connection with this invention, and in the upper part of which is movably mounted a magazine frame 2 to which are secured the above-named plurality of pairs of adjustable magazines 3, 3ᵃ, 4, 4ᵃ; in the drawings only two such pairs are represented, these being regarded as sufficient to illustrate the invention, the latter, however, is not restricted to the employment of two pairs, it being equally convenient for the machine to be provided with three or more pairs. In Figs. 9 and 10 there are represented only the one pair of magazines 3, 3ᵃ, the other pair 4, 4ᵃ having been omitted from these figures.

The magazine frame 2 and magazines 3, 3ᵃ, 4, 4ᵃ incline downward from back to front in the ordinary well-known way, and are capable of being moved *en bloc* in a direction perpendicular to the plane of their inclination, suitable guides 1ᵃ on the main frame 1 and rollers 2ᵃ, on the magazine frame 2, engaging with those guides, being provided for restricting the movement of the said magazine frame and magazines to that particular direction.

The magazines are held and registered in their shifted position by means of upstanding turrets 100 rotatably mounted in the machine frame, one at each corner of the magazine frame therein. These turrets are each provided with projecting studs 100ᵃ which engage in recessed blocks 100ᵇ attached to the magazine frame. It will be noted that each turret has two studs, one or the other of which will engage in the recessed block according to the position of the magazine frame, that is, according to whether the upper or lower pair of magazines is in operative position. The turrets are rotated by means of the handle 100^c connected to the lower right-hand turret, which latter is connected by links 100^d to the remaining turrets, the parts being so arranged that when the handle is moved in one direction all the turrets will be rotated to disengage their projecting studs from the recessed blocks 100^b, and when the handle is moved in the opposite direction, they will be rotated to engage their projecting studs in said blocks. A spring pressed detent 100^e coöperates with a projecting nose 100^f on the handle and holds the latter in its shifted position. All these parts are of well-known construction and constitute no part of our present invention.

For the sake of brevity, the several magazines, when hereinafter referred to as a single entity, are treated as a column of magazines, and are referred to as such. The raising and lowering of this column of magazines are effected through two rocking shafts 5, 6 which are connected with the magazine frame 2 through lever arms 7, 7 fast to the shafts, and links 8, 8 the latter pivoted to both those arms and the said frame. The shafts 5, 6 have other lever arms 9, 9, respectively fast thereon, which, as are also the parts 5, 6, 7, 8 and 9, are of known construction. Hitherto the two lever arms 9, 9 have been connected together by a link of unadjustable length, but upon the length of this link depends the position of the magazines relatively to the magazine entrance 10 and assembler plate entrance 11, and the angle of the said magazines, the latter having to be in exact coöperative relationship to the said entrances in order that the travel of the matrices from one to another of these parts may not be impeded. Much difficulty has heretofore been experienced in this connection, the slightest error in the position of the pivotal connections with the said link having been found causative of considerable disturbance in the aforesaid relationship. To overcome this difficulty in accordance with the present invention, the link is made so that its effective length may be varied, for instance its central part 12 may as shown in Figs. 1^a and 3, be screwed into the two ends 12^a, 12^a, and provided with lock nuts 12^b, 12^b that is to say, all after the manner of a turnbuckle; for convenience this link, when hereinafter referred to as a complete entity, is identified by the reference 12 previously used for identifying only its central part. By lengthening or shortening the link 12, the magazine frame 2 and magazines 3, 3^a, 4, 4^a, may be adjusted higher or lower at either or both ends. The two shafts 5, 6 are simultaneously rocked by means of a lever handle 13, fast to the shaft 5, and the weight of the magazine frame 2 plus that of the column of magazines and their contents, is practically counterbalanced by a spring 14 acting through an arm 15 fast to the shaft 6 in well-known manner.

The upper magazines 3 and 4 of the two pairs 3, 3^a and 4, 4^a have their sets or banks of escapement levers 16, respectively at their upper sides, and the lower magazines 3^a and 4^a have their escapement levers 17 at their lower sides, all as shown in Figs. 1 and 3. These different sets of escapement levers 16 and 17, in well-known manner, are operated by two sets of strikers or levers 18, 19 respectively, which normally occupy positions in which they are ready for engaging with the respective escapement levers 16, 17 of either pair of magazines when the latter are brought into operative relationship thereto by the raising or lowering of the column of magazines.

Figs. 1 and 3 show the column of magazines in its two different positions, Fig. 1 showing it as when the magazines 4, 4^a are in use, their escapement levers 16, 17 being then in operative relationship to the strikers 18, 19, at which juncture the magazines 3, 3^a and their escapement levers are out of operative position, and Fig. 3 showing the said column as when the magazines 3, 3^a are in use, with their escapement levers 16, 17 in operative relationship to the said strikers, and the magazines 4, 4^a and escapement levers out of operative position. Each of the strikers 19, is, at or near its middle pivotally connected to the so-called guide plate 20, on a stationary pivot 21, and, at its front end, it is pivoted to the upper end of an inclined striker link 22, and each of the strikers 18 is at its front end pivotally connected to the guide plate 20, on a stationary pivot 23 and at, or near, its center it is pivoted to the upper end of an inclined striker link 24. The two ranks of striker links 22 and 24 are arranged, the former at the front of the latter, and the rear ends of all the strikers 18, 19 are normally just in front of the path in which the front ends of the magazines 3, 3^a, 4, 4^a and of the escapement levers 16, 17 move when the column of magazines is raised or lowered. The lower end of each of the striker links 22, 24 is provided with a roller or lateral projection 25 with which engages the upper hooked or gapped end 26 of the respective escapement rod 27, 28 the lower end of which is capable of being engaged by a rod 29 which is actuated in well-known manner by an automatically operated cam-carriage whenever this latter is released by the depression of the respective key lever. These matrix-controlling key levers are not shown in the drawings as they constitute no part of the present invention and, moreover, they may be of the usual well-known construction. The escapement rods 27, 28 are arranged in two ranks each appertaining to one of the ranks of striker links 22, 24. The rank of rods 29 is brought into operative relationship to the rank of escapement rods 28 or 27 (according to which magazine 4 or 4ª—or alternatively 3 or 3ª—is to supply matrices to the assembling line) by successive depressions of a "light-touch" finger key 30, Fig. 5, which in the manner described in application for Letters Patent S. N. 657436, serves to control the operation of mechanism which automatically shifts the bank of rods 29 into and out of the aforesaid relationship with the banks of escapement rods 27, 28. This mechanism is represented in Fig. 5 and at the lower part of Fig. 12, but, as it has already been fully described in the above-named Letters Patent, no further explanation herein is deemed to be necessary.

The lower ends of the escapement rods 27, 28 when in normal position, terminate all in the same horizontal plane, and near that end the said rods are guided in a stationary guide or plate 31, Fig. 5 while, near their upper ends these rods are guided in a comb plate 32, see also Figs. 1 and 6, which is capable of being moved in a horizontal direction fore and aft of the machine, in or on stationary guides, 32ª engaging in slots 32ᵇ in the comb plate, the said comb plate at its two ends, being pivoted to two levers 33 fast to a shaft 34 supported in stationary bearings 35. These levers 33, herein termed comb-plate levers are acted upon by springs 36 which tend constantly to hold the comb-plate 32 and escapement rods 27, 28 in their rearmost position i. e. with their gapped ends 26 out of engagement with the rollers 25. It is essential that the escapement rods 27, 28 shall disengage the rollers 25 at the instant of opening the assembler plate 37, the guide plate 20 being rigidly attached to this assembler plate and therefore carrying the striker links 22, 24 away from the escapement rods 27, 28 whenever this opening takes place; this disengagement is rendered all the more necessary by reason of the fact that, as hereinafter fully explained, the movement of the assembler plate 37, during its opening and closing, is curvilinear and not rectilinearly fore and aft. If this disengagement of the escapement rods 27, 28 from the striker links 22, 24 were not provided for, either the striker links or the escapement rods might become twisted or distorted during the aforesaid opening, these devices being packed so closely together as to leave a minimum of clearance for the striker links 22, 24 to pass between the respective escapement rods 27, 28 during the opening and the subsequent closing of the assembler plate 37.

To attain the just mentioned result automatically, there is provided on that end of the assembler plate 37 which is remote from the pivot 38 thereof, a rearwardly-extending stud 39 which, when the assembler plate 37 is in normal working position, is in contact with a stud 40 adjustable in the forward end of a plate 41 whose rear end, see particularly Fig. 6, is pivoted to the adjacent lever 33, and whose intermediate part is formed with a slot 42 which engages with a stationary stud or roller 43 for guiding the plate 41 in fore and aft direction. When, with this arrangement, the assembler plate 37 is in its closed or normal position, and the stud 39 thereon is, as aforesaid, in contact with the stud 40, the comb plate 32 is held in its foremost position with, consequently, the gapped ends 26 of the escapement rods 27, 28, in engagement with the rollers 25, on the striker links 22, 24, as shown in Figs. 3, 5, 6 and 13, and when at the early part of the opening of the assembler plate 37, the stud 39 thereon, advances, the springs 36 immediately pull the comb plate 32 rectilinearly rearward, and with it, the upper ends of the escapement rods 27, 28, so as to disengage the gapped ends 26 of the latter from the rollers 25 and thereby leave the striker links 22, 24 free to move forward, without contacting with those ends, during the continued opening movement of the assembler plate 37. During the latter part of the closing movement of the assembler plate 37, the stud 39 thereon, comes into contact with the then-advanced stud 40, and through it, the plate 41 the lever 33 to which the said plate is pivoted, and the comb plate 32, moves forward the gapped ends 26 so that they again engage with the rollers 25.

The assembler plate 37, in certain constructions of the before particularized typographical machines, has been pivoted so that it can be swung forward rightwardly away from the exit mouths of the magazines, for enabling these magazines to be removed for having access to the rear of the said plate, and for other purposes, but these existing arrangements have not always provided sufficient clearance for enabling the said purposes to be conveniently effected, and one of the objects of the present invention is to provide an arrangement wherein this drawback is absent. This result is attained by pivotally connecting the assembler plate 37 to the fixed frame i of the machine by means of what may be regarded as a double joint comprising two pivots 38 (hereinbefore mentioned) and 44, the latter of which is stationary and may be regarded as the equivalent of the single stationary pivot of the before-mentioned existing arrangements. This stationary pivot 44 is rigidly secured to the machine frame 1 in any convenient manner, and upon it is pivoted an arm 45 to whose swinging end the assembler plate 37 is pivoted by the second pivot 38. This arrangement, it will be readily seen, provides for the swinging of the assembler plate 37 backward upon both of the pivots 38, 44 as shown in Figs. 14 and 15, to such an extent as to bring its front surface close against the right-hand side of the machine, and this, in spite of the fact that some member of the machine may obstruct the path of the arm 45 and prevent it from accompanying the assembler plate 37 throughout the full extent of its motion. If necessary, a fixed track or plate 1$^b$, Fig. 1, on the machine frame 1 and a shoe, caster or equivalent (not shown) on the assembler plate 37 traveling over the said track may be provided for taking the weight of the assembler plate 37 during its opening and closing movement.

In view of the capacity of the assembler plate 37 to turn about both of the pivots 38 and 44, means are necessary for insuring that, while it is being closed, it shall be brought into such position that, at the termination of such closure, the gapped ends 26 engage each with its respective roller 25. For attaining this result the assembler plate 37, as shown in Fig. 11, has pivoted to it a roller 85 capable of rotating upon a vertical pin or stud 86 secured in the lower edge of the said plate, and of engaging with a registering gap 87, between two projections or horns 88, 89. The right-hand horn 89 is curved, as indicated by the shade lines in Fig. 11, so as to form a track over which the roller 85 travels during the closing of the assembler plate and which, at that juncture, serves to guide the assembler plate into its proper closing position.

To secure the assembler plate 37 in its closed position, there is provided a pivoted latch 90 capable of being turned about the axis of a stationary screw or pivot 91 from one to the other of the two positions indicated in full and dotted lines respectively in Fig. 11. The latch 90 is formed with a recess 92 capable of engaging with the neck or stem of a stationary screw or stud 93 which, when the assembler plate 37 is in its closed position, extends through a hole 94 in the latter, so that, as shown in full lines in Fig. 11, the recess 92 of the latch 90 can be engaged with the stud 93 behind the head of the latter, to lock the assembler plate 37 in its closed position. In addition to the latch 90, there may be provided a second latch 95 slidable on the left-hand vertical edge of the assembler plate 37 and capable of being engaged with, and disengaged from, two stationary screws or studs 96. So long as the latches 90, 95 both engage with their respective studs 93, 96, the assembler plate 37 will be retained in its closed position, and before opening the assembler plate, the latch 95 must be moved into its lowermost position and the latch 93 swung into the position in which it is shown in dotted lines in Fig. 11, so that both of such latches will then be disengaged from the said studs. Or, instead of the devices 95, 96, a spring catch may be provided to fulfil a like function.

When the machine, as in the example illustrated, is provided with a pi-stacker or pi-magazine 46, this is attached to the assembler plate 37 and swings with it about the axes of the two pivots 38, 44, and connection between it and the distributer bars 47, 48, is maintained by flexible chutes 49, 50 which serve to conduct the pi-matrices from the said bars to the pi-stacker or magazine, and yet allow the latter to move with the assembler plate 37 without disturbing the aforesaid connection.

The distributer mechanism comprises two sets of distributer screws 51 and 52 of which the set 51 for the upper magazine 3 or 4, is lower and more forward than the set 52 for the lower magazines 3$^a$ or 4$^a$. The matrices 53 to be received in the upper magazines 3, 4 have notches 54 in their feet as shown in Figs. 9 and 10, while the matrices 55 appertaining to the lower magazines 3$^a$, 4$^a$ are without such notches. All the matrices 53, 55 are raised by the toothed V-bar 56, Fig. 7 of the known second elevator up to the level of the lift box 57 which is practically alined with the distributer bar 48 appertaining to the lower magazines 3$^a$, 4$^a$, and, all of them, as in existing machines, are pushed off the said toothed V-bar 56 on to a similarly toothed V-bar 58 in the lift box 57, to the right-hand end of the latter, where their further progress is momentarily arrested by the successively leading matrices 53, 55 coming into contact with stop shoulders, at which juncture they are engaged by a lifter 59 which lifts each successively leading matrix into engagement with the distributer screws 52, those for the lower magazine 3$^a$ or 4$^a$ being supported by their unnotched feet traveling along a central rail 60 until the distributer screws 52 carry them into engagement with their distributer bar 48 in the ordinary way, while those destined for the upper magazine 3 or 4 by reason of the notches 54 in their feet, drop down over the just-named central rail 60 sufficiently to prevent them from being engaged by the distributer bar 48, and, after passing over the right-hand end of that rail 60, they drop into a chute 61 which conducts them to a distributer or separator box 62 wherein, by already well-known means, they are separated and allowed successively to engage with the lower set of distributer screws 51.

In view of the distance of the receiving end of the lower magazines 3ª or 4ª, from the corresponding or upper distributing bar 48, the magazine entrance 10ª which conducts the matrices from the latter to the said magazine, is of considerable length as shown in Figs. 2, 3, 9 and 10, and if this entrance were divided into separate channels by partition plates, as ordinarily, it might allow matrices with bent lugs or otherwise distorted, to reach that magazine, and block the exit end of the said magazine entrance. If this blockage remained unnoticed by the operator for an appreciable length of time it would result in the following matrices destined for the same magazine channel becoming piled one above another in the blocked entrance channel and perhaps eventuate in the exhaustion of the corresponding magazine channel and a consequent absence of the respective letters or characters from the composed lines, and involve a re-setting of those lines. To overcome that difficulty the magazine entrance 10ª (throughout nearly the whole of its height)—like the magazines themselves—has its upper and lower walls formed with grooves or channels 63, which serve to guide the matrices passing through the said entrance, by their lugs only, and which are not wide enough to admit bent or distorted lugs, so that, as a consequence of this arrangement, immediately a matrix having such bent or distorted lugs is presented for admission into the entrance 10ª, it will not enter the latter, and will either itself, or through a succeeding matrix, effect the stoppage of the distributer screws 52. This last-named result may be obtained through the lateral deflection of partition plates 64 at the receiving or upper end of the magazine entrance 10ª, in a manner similar to that already known, although it is to be observed that, as distinguished from known arrangements, the partition plates 64 are present only at the said receiving or upper end, and serve to form between them channels alined with the before-described grooves or channels 63.

In multiple magazine machines provided with two magazine entrances as heretofore constructed, the said entrances have been pivoted so as to be capable of turning one (that appertaining to the upper magazine) forwardly, and the other one rearwardly; in that arrangement the said entrances could not be opened so as to leave unobstructed the upper ends of both the magazines simultaneously. The present invention provides for that difficulty being overcome, by pivoting the two magazine entrances so that, as shown in Fig. 10, they can both be turned rearwardly sufficiently to admit of the interior of both the two magazines then in operative position, being inspected or cleaned from end to end.

The magazine entrances 10ª and 10ᵇ have respectively portions of their front and rear walls hinged to constitute flaps 65, 66, so that when the entrance 10ª, is moved rearwardly, as shown in Fig. 9, either or both of these flaps can be opened to enable obstructing matrices to be removed from the said entrances, or for other purposes; the flap 66 is so arranged, that it is automatically closed by the act of returning the entrance channel 10ª to its normal position, and the flap 65 may be closed by gravity or by a light spring or other equivalent device.

Heretofore difficulty has been experienced in removing the before-mentioned separator box 62 from the distributing mechanism, for the reason that the separator cam 67 has a diameter greater than the distance between the front and back walls of the said separator box, so that, as a consequence thereof, the latter could not be moved leftward past it. According to the present invention, this difficulty is entirely overcome by having the cam 67 rotatably attached to, and removable with, the separator box 62. For this purpose the cam 67 as shown best in Fig. 8, is formed in one part with, or is operatively fast to, a clutch member 68, and together with that member is journaled in a bracket bearing 69 fast to one or other of the above-named front and back walls, and the said clutch member 68 is capable of being engaged with, and disengaged from, a counterpart clutch member 70 fast on the shaft 71 of particular distributer screw 51 from which it receives its rotary motion. In the construction illustrated, see particularly Fig. 8, the cam 67 and clutch member 68 are integral with each other and with an intermediate part or hollow shaft 72 which is that by which this whole entity is rotatably supported in the bracket bearing 69. This said entity is axially bored to substantially the diameter of the adjacent end of the distributer screw shaft 71, so that it can receive, and receive support from, that part of the said shaft. As an alternative to the before described clutch faces it may be explained that the detachable connection of the cam 67 to the distributer screw shaft 71 may be effected by the engagement of a slot or recess in the right hand end of the hollow shaft 72, with a stud or projection fast to the said screw shaft. The separator box 62 is held in operative position, that is to say, with the cam 67 in engagement with the distributer screw shaft 71, by any of the usual well-known means (these are not shown in the drawings) and when these means are released, the box 62, together with the cam 67, can, as a single entity, be removed from the machine, a reversal of these operations being necessary to replace and secure the box in the machine.

The driving mechanism of the two distributers 51, 52 is so arranged that when the lower distributer 51 is unclutched (this is effected as ordinarily) it also automatically effects the stoppage of the upper distributer 52, but when the upper distributer 52 is unclutched, this has no effect upon the lower one, so that a line then in progress of distribution in the lower distributer 51, will be completely distributed without interruption. This may be effected by operating the lower distributer 51 by a pulley 73 loose on the distributer driving shaft 74 and engaging the said shaft as ordinarily—through a friction clutch 75, 76 of which one part 75 is formed on the pulley 73 and the other part 76 is splined to and axially movable on the shaft 74, this latter part 76 itself being operatively fast to pulley 77 which transmits motion to a pulley 78 loose on the upper distributer driving shaft 79 through a friction clutch 80 in the usual way. The friction clutch 75, 76 and the clutch 80 are each capable of being—as ordinarily—opened by a stud or projection 81 or 82 respectively which, by any obstruction in the respective distributer 51, 52 is caused or allowed to enter the path of a cam or cams 83 formed on or fast to the axially movable part of the clutch 75, 76 or 80, this last-named part being in the case of the clutch 75, 76, the pulley 77 and in the case of the clutch 80, the disk 84.

Having described our invention, we declare that what we claim and desire to secure by Letters Patent is:—

1. In a typographical composing machine, the combination with two distributer mechanisms and two assembler plate entrances, of a plurality of superposed magazines arranged in a plurality of pairs and adjustable so that each pair can in turn be brought into or out of operative relationship with or to the distributer mechanisms and assembler plate entrances.

2. In a typographical composing machine, a series of superposed magazines arranged in a plurality of pairs, a bank of escapement levers on each magazine, the escapement levers on the two magazines of each pair being located one bank on the under side of one magazine, and the other bank on the upper side of the companion magazine.

3. In a typographical composing machine, the combination of two superposed magazines, a bank of escapements on the upper side of the upper magazine, a bank of escapements on the under side of the lower magazine, two banks of striker levers for actuating the escapements positively in effecting their releasing action, those of one bank being pivoted at one end and arranged to engage at their other end beneath the escapements for the upper magazine, and those of the other bank being pivoted between their ends and arranged to engage above the escapements of the lower magazine, and two banks of operating links connected to the striker levers.

4. In a typographical composing machine, the combination with a movable assembler plate, of a plurality of pivots pivoting it to the main frame, the said pivots having their axes in parallel vertical planes and about, or relatively to each of which axes individually the assembler plate is capable of being moved angularly.

5. In a typographical composing machine, the combination with an assembler plate, and a plurality of pivots pivoting it to the main frame and about either or both of which the plate may be turned, of registering or positioning means for the said assembler plate.

6. In a typographical composing machine, the combination with an assembler plate and a plurality of pivots pivoting it to the main frame and about either or both of which the plate may be turned, of registering or positioning and locking devices for the said assembler plate.

7. In a typographical composing machine, the combination with an assembler plate capable of being opened and closed, and striker links and escapement rods, the operative connection between the said links and rods being disturbed during the opening movement of the assembler plate and established during the closing movement of that plate, of means controlled by the assembler plate for expediting the said disturbance and establishment of operative connection at or approximately at respectively the commencement of opening and the finish of closing of said assembler plate.

8. In a typographical composing machine, the combination with a movable assembler plate, striker links carried by that plate and escapement rods with which the striker links are moved into and out of operative engagement by the movement of the assembler plate, of a movable comb plate guiding the escapement rods, devices constantly tending to move the comb plate so as to disturb the aforesaid operative connection and means movable with the assembler plate preventing such movement of the comb plate when the assembler plate is closed.

9. In a typographical composing machine, the combination with the distributer mechanism and a movable assembler plate of a pi-stacker or pi-magazine movable with the assembler plate and flexible chutes maintaining constant connection between the distributer mechanism and the pi-stacker or pi-magazine, irrespective of the position of the assembler plate.

10. In a typographical composing machine, the combination of a plurality of magazines, independently mounted magazine entrances, one for each of the magazines in operative position at any one time, and movable rearwardly from their operative positions, and means whereby the said entrances can be moved relatively to the magazines into such position as to enable the interior of the latter to be inspected from end to end.

11. In a typographical machine, the combination of two distributers, a plurality of magazines movably arranged to bring different selected pairs of magazines into operative relation thereto, and two magazine entrances for conducting the matrices from the distributers to the selected pair of magazines, the said entrances being arranged so as to be movable from their operative position to give access to the magazines.

12. In a typographical machine, the combination of two distributers, a driving shaft for each, a main driving pulley loosely mounted on the shaft of one of the distributers, a second pulley fast to said shaft, a clutch to connect said pulleys, a third pulley connected to the second pulley and mounted loosely upon the shaft of the other distributer, a clutch to connect it with its shaft, and independent means for opening the two clutches, for the purpose described.

13. In a typographical machine, the combination of assembling devices, and a supporting frame therefor movable to and from its operative position, the said frame being mounted to turn about a plurality of independent axes in its aforesaid movements.

14. In a typographical machine, the combination of two sets of escapement-actuating devices, one connected to and operated by the other, a supporting frame carrying one of said sets and movable at will from its operative position, and automatic means distinct from the supporting frame for breaking the operative connection between the sets, the said means being controlled by the movement of the frame.

15. In a typographical machine, the combination of two sets of escapement-actuating devices, one connected to and operated by the other, a supporting frame carrying one of said sets movable to and from its operative position, and automatic means distinct from the supporting frame for making and breaking the operative connection between said sets as the frame is moved to and from its operative position, respectively.

16. In a typographical machine, the combination of a set of escapement-actuating devices mounted in the machine frame, a second set of actuating devices operated by the first set, a movable supporting frame wherein the second set is mounted, and means whereby the movement of the supporting frame will shift the first set of actuating devices from their operative position in the machine frame to disconnect them from the actuating devices of the second set.

17. In a typographical machine, the combination of a set of escapement-actuating devices mounted in the machine frame, a second set of actuating devices operated by the first set, a supporting frame wherein the second set is mounted movable to and from operative position, and means whereby the first set of actuating devices will be moved to and from its operative position in the machine frame so as to be connected with and disconnected from the second set as the frame is moved to and from its operative position, respectively.

18. In a typographical machine, the combination of a distributer, a sorts receptacle mounted in the machine so as to be movable to different positions, and a tube or chute leading from the distributer and permanently connected with the sorts receptacle, the said tube being flexible so as to maintain such connection in any of the different positions of the sorts receptacle.

19. In a typographical machine, the combination of two magazines, and a magazine entrance coöperating with each of the magazines, one of said entrances being pivotally movable and the other bodily movable from its operative position; whereby the several entrances may be so arranged as to give access to both ends of the two magazines.

20. In a typographical machine, the combination of a plurality of magazines arranged in close proximity to each other and movable to bring different pairs thereof into operative position, and a magazine entrance coöperating with each of the operative magazines, the said entrances being mounted independently of each other and movable backwardly and downwardly from their operative position.

21. In a typographical machine, the combination of two magazines, one arranged above the other, magazine entrances coöperating with the two magazines, and separate and independently mounted supporting frames for the two entrances, the supporting frame for the upper entrance being arranged so as to carry its entrance bodily and downwardly to locate it below the mouth of the lower magazine, for the purpose described.

22. A magazine entrance for typographical machines formed with a series of channels, each of said channels comprising a set of opposed grooves and a pair of partition plates at opposite sides of the grooves.

23. A magazine entrance for typographical machines formed at its upper end with a series of partition plates, and with a series of grooves leading from the spaces between said plates and extending throughout the length of the magazine entrance.

24. In a typographical machine, the combination of two distributers, a plurality of distinct pairs of magazines, and means whereby one or another of said pairs may be connected to the two distributers.

25. In a typographical machine, the combination of two distributers, and a plurality of magazines arranged in distinct pairs and movable to bring one or another pair into operative relation to the two distributers.

26. In a typographical machine, the combination of two assembler entrances, and a plurality of magazines arranged in distinct pairs and movable to bring one or another pair into operative relation to the two assembler entrances.

27. In a typographical machine, the combination of a plurality of superposed magazines provided with escapements and arranged in pairs, and two series of actuating devices adapted to be connected to the escapements of one or another of said pairs.

28. In a typographical machine, the combination of a plurality of superposed magazines each provided with escapements and movable to bring one pair or another into operative position, and two series of actuating devices to coöperate with the escapements of the selected pair of magazines.

29. In a typographical machine, the combination of a plurality of magazines each provided with escapements and movable to bring one pair or another into operative position, and two series of actuating devices to coöperate with the escapements of the selected pair of magazines, the said actuating devices being arranged normally out of the path of movement of the magazines so that they may be moved at will without any preparatory adjustment of the parts.

30. In a typographical machine, the combination of two assembler receiving devices, and a plurality of magazines arranged with two of them in operative relation to the receiving devices, the said magazines being movable to bring two different magazines of said plurality simultaneously into operative relation to the receiving devices.

31. In a typographical machine, the combination of two fixed assembler receiving devices, and a plurality of magazines movable as a whole to bring one or another pair thereof into operative relation to the two receiving devices.

32. In a typographical machine, the combination of a plurality of magazines, and two distributers coöperating with two of the magazines, the said parts being arranged so that two different magazines of said plurality may be brought simultaneously into operative relation to the two distributers.

33. In a typographical machine, the combination of a plurality of magazines, and two distributers coöperating with two of said magazines, the said magazines being movable to bring two different magazines of the plurality simultaneously into operative relation to the two distributers.

34. In a typographical machine, the combination of two fixed distributers, and a plurality of magazines movable as a whole to bring different pairs of magazines into operative relation thereto.

35. In a typographical machine, the combination of a plurality of superposed magazines, and two adjacent assembler receiving devices therefor, the said parts being arranged so that different pairs of adjoining magazines in said plurality may be brought into operative relation to the receiving devices.

36. In a typographical machine, the combination of a plurality of superposed magazines, and two fixed assembler receiving devices adapted to coöperate with two adjoining magazines, the said plurality being movable to bring different pairs of adjoining magazines thereof into operative relation to the said devices.

37. In a typographical machine, the combination of a plurality of magazines, and two adjacent distributers therefor, the said parts being arranged so that different selected pairs of adjoining magazines of said plurality may be brought into operative relation to the two distributers.

38. In a typographical machine, the combination of two fixed adjacent distributers, and a plurality of magazines movable as a whole to bring different selected pairs of adjoining magazines thereof into operative relation to the two distributers.

39. In a typographical machine, the combination of distributing mechanism, and a plurality of superposed magazines movably mounted so as to bring one or another pair thereof into operative relation to the distributing mechanism.

40. In a typographical machine, the combination of distributing mechanism, and a plurality of superposed magazines movable as a whole to bring one or another pair thereof into operative relation to the distributing mechanism.

41. In a typographical machine, the combination of a series of movable magazines, a plurality of assembler entrances, less in number than that of the magazines, and each adapted to coöperate with only one magazine at a time, and means for moving the magazines relatively to the several assembler entrances in order to bring different pluralities of magazines into operative relation thereto for conjoint use.

42. In a typographical machine, the combination of a plurality of distributing mechanisms, a corresponding plurality of assembler entrances, each adapted to coöperate with only one magazine at a time, and a series of magazines shiftable to bring different corresponding pluralities thereof into operative relation to the several distributing mechanisms and assembler entrances.

43. In a typographical machine, the combination of three or more magazines movable to bring different pairs thereof into operative position for conjoint use, and two coöperating distributing mechanisms for the several operative magazines.

44. In a typographical machine, the combination of a plurality of magazines and two distributing mechanisms therefor, one of said parts being movable relatively to the other so as to connect the two distributing mechanisms to different selected pairs of magazines.

45. In a typographical machine, the combination of two distributing mechanisms, and three or more magazines movably arranged so that one or another pair thereof may be brought into operative relation to the two distributing mechanisms.

46. In a typographical machine, the combination of two assembler entrances, and three or more magazines movably arranged so that one or another pair thereof may be brought into operative relation to the two assembler entrances.

47. In a typographical machine, the combination of a plurality of magazines movably arranged so that one or another pair thereof may be brought into operative position, a keyboard mechanism, and means whereby the keyboard mechanism may be connected to one or the other of the magazines of the selected pair.

48. In a typographical machine, the combination of two distributers, a plurality of magizines movable to bring different selected pairs thereof into operative relation to the distributers, and a keyboard mechanism for delivering the matrices from the selected pair of magazines.

49. In a typographical machine, the combination of a plurality of magazines, two distributers, means whereby different selected pairs of magazines may be connected to the two distributers, and a font separator for delivering the matrices to one or another of the distributers, as required.

50. In a typographical machine, the combination of two fixed distributers, a plurality of magazines movable to bring different pairs thereof into operative relation to the two distributers, and a font separator for delivering the matrices to one or another of the distributers, as required.

51. In a typographical machine, the combination of two magazines each provided with escapements, two banks of actuating devices for the escapements of the several magazines, and a supporting frame for the actuating devices, the said supporting frame being movably mounted in the machine so as to carry the two banks of actuating devices away from the magazines to give access thereto.

52. In a typographical machine, the combination of two magazines each provided with escapements, two banks of actuating devices for the escapements of the several magazines, two corresponding banks of operating rods therefor, and a supporting frame wherein the actuating devices are mounted and movable to carry them into and out of operative relation to their corresponding escapements and operating rods.

In witness whereof we have hereunto set our hands in the presence of two witnesses.

HERBERT PEARCE.
JOHN ERNEST BILLINGTON.

Witnesses:
 EWALD SIMPSON MOSELEY,
 MALCOLM SMETHURST.